United States Patent
Hoffner et al.

(10) Patent No.: US 8,107,945 B2
(45) Date of Patent: Jan. 31, 2012

(54) WIRELESS DEVICE REMOTE RECOVERY

(75) Inventors: Barry Hoffner, Bridgewater, NJ (US); Ronald Stamm, Flemington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 303 days.

(21) Appl. No.: 12/415,743

(22) Filed: Mar. 31, 2009

(65) Prior Publication Data

US 2010/0248707 A1    Sep. 30, 2010

(51) Int. Cl.
| | |
|---|---|
| H04M 3/00 | (2006.01) |
| H04W 24/00 | (2009.01) |
| G06F 11/00 | (2006.01) |
| G06F 11/16 | (2006.01) |

(52) U.S. Cl. ......... 455/419; 455/418; 455/423; 714/6.3; 714/6.31; 714/27; 714/38.1

(58) Field of Classification Search .................. 455/418, 455/419, 423, 425; 707/203, 205; 709/217, 709/250; 714/2, 3, 4.11, 4.4, 6.11, 6.3, 15, 714/17, 37, 38.14, E11.008, E11.084

See application file for complete search history.

(56) References Cited

U.S. PATENT DOCUMENTS

| | | | |
|---|---|---|---|
| 5,635,979 | A | 6/1997 | Kostreski et al. |
| 6,742,134 | B1 | 5/2004 | Pothier et al. |
| 6,876,644 | B1 | 4/2005 | Hsu et al. |
| 7,200,390 | B1 | 4/2007 | Henager et al. |
| 2001/0053688 | A1* | 12/2001 | Rignell et al. ............... 455/414 |
| 2004/0025086 | A1* | 2/2004 | Gorday et al. ............... 714/37 |
| 2004/0153724 | A1* | 8/2004 | Nicholson et al. ........... 714/6 |
| 2005/0164694 | A1* | 7/2005 | Kim ............................ 455/419 |
| 2006/0085666 | A1* | 4/2006 | Stakutis et al. .............. 714/2 |
| 2007/0050678 | A1* | 3/2007 | Estes et al. .................. 714/38 |
| 2007/0168690 | A1* | 7/2007 | Ross ............................ 714/4 |
| 2008/0119164 | A1* | 5/2008 | Jiang ............................ 455/410 |
| 2009/0249120 | A1* | 10/2009 | Yao et al. .................... 714/15 |

FOREIGN PATENT DOCUMENTS

WO    WO 2007/024350 A1    3/2007

OTHER PUBLICATIONS

B. Steinke et al., "Advanced Device self Management through Autonomics and Reconfigurability," 16th 1st Mobile and Wireless Communications Summit, 2007 IEEE, Jul. 1, 2007, pp. 1-4.
J.O. Kephart et ., "The Vision of Autonomic Computing Outlook," vol. 36, No. 1, Jan. 1, 2003, pp. 41-50.
European Search Report issued in European Patent Application No. EP 10158832.5 dated Mar. 22, 2011.

* cited by examiner

*Primary Examiner* — George Eng
*Assistant Examiner* — Bryan Pitt
(74) *Attorney, Agent, or Firm* — McDermott Will & Emery LLP

(57) ABSTRACT

Disclosed techniques enable wireless remote recovery for a wireless device that has encountered a potentially unrecoverable programming error during execution of a primary program controlling operations of the wireless device, e.g. an error that might otherwise prevent network communications. In response to the error, program execution changes over from the primary program to execution of a backup program. Under control of the backup program, the wireless device initiates a communication with a recovery server, over the air through a wireless network serving the wireless device. The communication utilizing the backup program enables the wireless device to receive programming from the recovery server, including a replacement version for at least a portion of the primary program. The primary program can then be corrected by replacing the portion thereof with the received replacement version. The wireless device then resumes normal operation, by resuming execution using the corrected primary program.

20 Claims, 4 Drawing Sheets

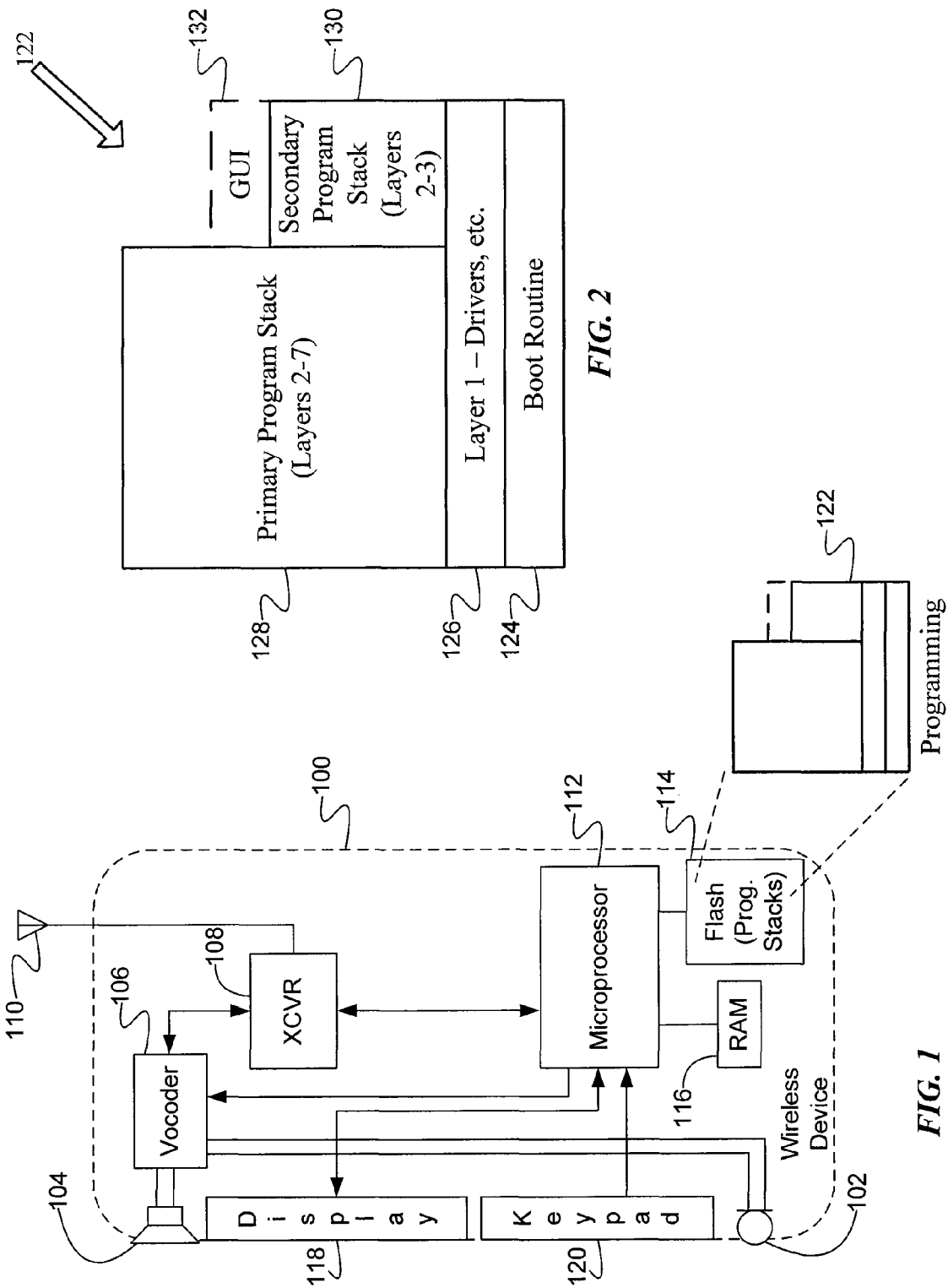

WIRELESS DEVICE REMOTE RECOVERY

TECHNICAL FIELD

The subject matter disclosed herein encompasses technologies to permit reprogramming of a wireless device or other wireless device over the air through a mobile communication network, for example, even in the event of a programming error in the device that otherwise would interrupt or prevent communications of the device through the mobile network.

BACKGROUND

Services through public mobile communication networks have exploded in popularity, in recent years. To meet the increased demand for service and for ever more sophisticated features, mobile communication networks are undergoing rapid deployment and upgrades. Network upgrades also have increased the reliability of the mobile communication services. As a result, customers in increasing numbers are adopting mobile communication networks as their primary platform for voice and data services, in some cases, even to the point of abandoning traditional land line telephone service. Likewise wireless devices, such as mobile handsets, wireless smart phones, PDAs, embedded wireless modules, etc., have become advanced in their processing and storage capacities, functionality, and ability to operate across many communication networks including WAN, LAN and PAN and across both terrestrial and satellite based networks. High-end wireless devices, sometimes referred to as "smart phones" or "communicators," offer a wide area of on-line and off-line capabilities, such as multimedia (e.g. music, videos or the like) downloading via the wireless network and off-line playback. With such advances of the mobile communication network and wireless devices comes increasing complexity of the programming of the devices, which also increases vulnerability to various types of programming faults. This creates a need to seamlessly repair "bugs" and errors on the device with little or no service downtime to the end user.

In order to fix bugs, prevent errors, and fix preexisting errors in wireless devices, service providers started implementing Over-The-Air ("OTA") systems that allow a user to download firmware and software updates directly to the device. Updates may be downloaded to a wireless device automatically or in response to an end-user initiation, "pull", such as via a user interface. Service providers, enterprises or end-users may, via a predefined network interface, also "push" updates to the wireless devices. While OTA methods provide enhanced functionality and reliability, they are limited by the ability of a given wireless device to communicate via the mobile communication network in order to download such updates. Also, even if communications are available, OTA updates may not be able to handle all potential faults.

Some programming faults (bugs, errors, viruses or the like) may be so severe as to prevent the wireless device from communicating via the mobile network. As a result, the wireless device may experience an error that prevents wireless device from self-correcting the error via OTA update or the like provided through the mobile communication network by the mechanisms mentioned above. These and other "unrecoverable" errors typically occur as a result of a software malfunction, loss or improper overwrite of access identifier(s) or security keys, a software conflict, or a virus or other mobile malicious software (often referred to as "malware") that has been downloaded to the wireless device. For example, software downloaded to a wireless device that conflicts with the preexisting software of the wireless device or that is not installed completely may cause an unrecoverable error. Such software may be downloaded by the user of the wireless device from a variety of providers/sources or may even be provided by the service provider via the OTA system described above.

In instances where a wireless device has an "unrecoverable" error or fault in its programming, although it is able to power-on it may not be able communicate through the wireless service(s) offered by the mobile network (e.g. no voice call, no messaging, and no data communications). As a result, the user's only recourse is to acquire a new device or have the existing device repaired. In order to repair the device unfortunately requires a user to physically return the device to the store of purchase, the original equipment manufacturer ("OEM"), or another location that has the capability to service the device. During service, the device may be connected to PC to perform a diagnostic check of the device and determine the type of error. If the error resides in the device programming, such as the "firmware", the PC will erase preexisting firmware on the device and upload new firmware to the device. Although effective to correct the programming error, such a repair results in significant wireless device downtime and inconvenience to the user.

Hence a need exists for more effective techniques to correct unrecoverable errors in devices, for example, that allow a service provider to seamlessly correct unrecoverable errors and that do not require a user to physically submit the device to service location personnel for servicing and/or that reduce downtime of the wireless device and its use of the mobile communication services.

SUMMARY

The teachings herein provide an effective technique for repairing or correcting a potentially unrecoverable error or program fault in a wireless device, for example, which will allow over air/wireless communications with the station to obtain corrective programming, which eliminates the need for the user to take or send the wireless device to a service/repair facility.

An exemplary method of wireless remote recovery for a wireless device involves detecting a potentially unrecoverable programming error during execution of a primary program by a programmable controller controlling operations of the wireless device. The error detection may be performed by either a programmable controller automatically controlling operations of the wireless device or by manual intervention. In response to detection of the error, execution of programming by the programmable controller changes over from execution of the primary program to execution of a backup program. Under control of the backup program, the wireless device initiates a communication with a recovery server, over the air through a mobile network serving the wireless device. The recovery technique also includes receiving programming from the recovery server via the communication through the mobile network. The received programming includes a replacement version for at least a portion of the primary program. The primary program in storage in the wireless device can then be corrected by replacing the portion of the primary program with the received replacement version, to correct the programming error. The wireless device then resumes normal operation, by resuming programmable controller execution using the corrected primary program from storage in the wireless device.

The error detection to trigger the change over to the backup program may be responsive automatic error detection or some manual activation of the device by a user. Hence, the potentially unrecoverable programming error could be detected in the form of a particular user input, e.g. a selection of a recovery operation via a display menu and cursor control or keypad input or other appropriate operation of the wireless device's user interface. For example, change over to execution of the backup program may be performed in response to the press of a manual key sequence or "reset" button. However, in an example described in more detail below, the detection of an unrecoverable programming error is at least partially automatic. For example, the programming may allow the programmable controller of the wireless device to detect when it is unable to operate normally, particularly when it is unable to communicate. If the programmable controller verifies that the mobile network is currently available, the abnormality apparently resides in the wireless device. Since the network is available but the wireless device can not communicate, the wireless device can not utilize its primary programming to recover the fault via network communications, which means that the automatically detected error is a programming error that is potentially unrecoverable. In another example, there may be cases the wireless device error may make the primary program unable to detect the wireless network. The backup program may also be invoked in this scenario as well. If the backup program is also unavailable to the backup program, it may be concluded that the primary program may be functioning properly.

The recovery server may send program blocks or modules in some sequence, for individual replacement of corresponding parts of the stored primary program. However, in the examples, the programming received from the recovery server includes a replacement version for the entire primary program and may include a replacement copy of the backup program.

To facilitate the recovery program communication, the wireless device may provide information regarding the wireless device to the recovery server, upon establishing the communication with the recovery server through the mobile network. For example, the recovery server may select and send programming to the wireless device via the wireless network, based on the information regarding the wireless device. The information regarding the wireless device, for example, may identify the make and model of the device. In some instances it may also be useful to identify the primary program currently in storage in the device.

Other concepts disclosed herein relate to unique software for implementing any of the remote wireless device recovery techniques outlined above. A software product, in accord with such a concept, includes at least one machine-readable medium and information carried by the medium. The information carried by the medium may include executable backup program code and/or information for the backup program, to enable a wireless device to initiate communication through a wireless network to a recovery server and enable downloading of programming to replace programming of the wireless device that may have encountered a potentially unrecoverable error.

The detailed description and drawings also disclose a wireless device for communication through a mobile network. The exemplary wireless device includes a transceiver for over the air communication to and from the mobile network and a programmable controller that controls operations of the wireless device including communications of the wireless device through the mobile network. Storage in the wireless device contains programming for execution by the programmable controller. Execution of a primary program by the programmable controller controls normal operations of the wireless device, including normal communications through the mobile network. Execution of the primary program also enables the controller to detect a potentially unrecoverable programming error during execution of the primary program. The stored programming also includes a backup program. The programmable controller switches over execution from the primary program to the backup program, in response to the detection of the potentially unrecoverable programming error in the primary program. Execution of the backup program by the programmable controller causes wireless device to communicate over the air through the mobile network with a recovery server, to obtain programming including a replacement version for at least a portion of the primary program. The primary program can then be corrected, by replacing the portion of the primary program in the storage with the received replacement version, to correct the programming error. After this correction, the wireless device resumes its normal operation, when the programmable controller resumes execution using the corrected primary program from the storage.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 is a high-level functional block diagram of a generic wireless device, for communication through a public or private wireless communication network, which may implement a wireless remote recovery procedure upon detecting an otherwise unrecoverable programming fault.

FIG. 2 illustrates exemplary programming, which may be stored in memory of the wireless device of FIG. 1, for supporting normal operations of the wireless device, for detecting an otherwise unrecoverable programming fault and for implementing the wireless remote recovery procedure.

DETAILED DESCRIPTION

Figure 3:
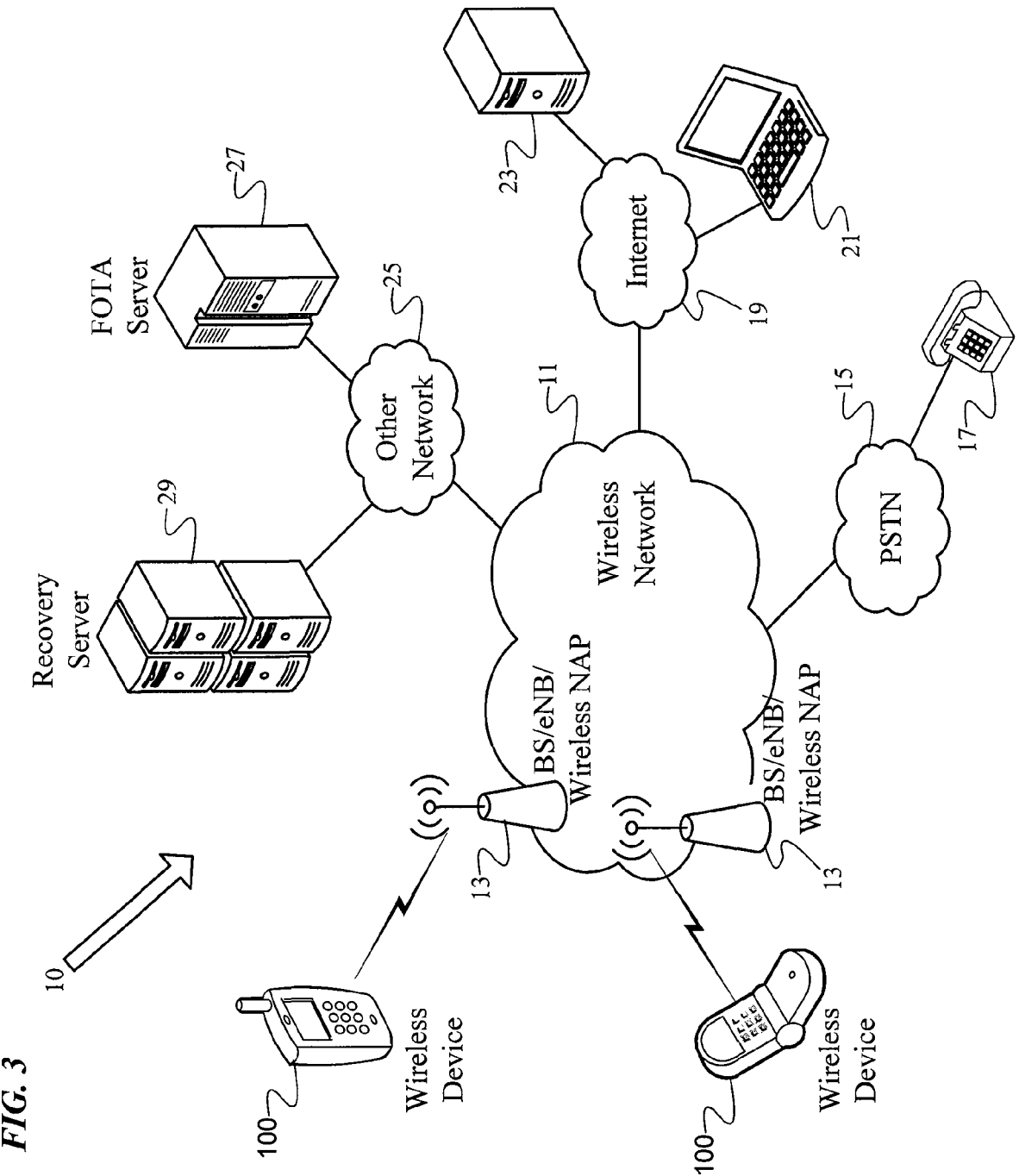
FIG. 3 is a high-level functional block diagram of a typical mobile communication network providing wireless communication services to wireless devices, such as the wireless device of FIG. 1, and which supports the wireless remote recovery procedure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Techniques, software and equipment are disclosed that detect a potentially unrecoverable error of fault in the primary programming of a wireless device and correct such an unrecoverable error over the air, provided that such wireless device is capable of communicating via a mobile network using a backup program. Aspects of the technique are embodied in the wireless device as well as an element such as a server that communicates with the wireless device via the mobile network. Hence, explanation of the wireless remote recovery technique will be provided in the context of an exemplary wireless device and communication network that implement the wireless remote recovery, as well as programming involved in such an implementation. Reference now is made in detail to the examples illustrated in the accompanying drawings and discussed below.

First, we will consider FIG. 1, which provides a block diagram illustration of an exemplary wireless device 100. Although the wireless device 100 may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes a digital transceiver (XCVR) 108. The concepts discussed here encompass embodiments of the station 100 utilizing any digital transceivers that conform to current or future developed digital wireless communication standards. For example, the digital transceiver 108 could be an EvDO, TDMA or GSM unit designed for cellular or PCS operation. The transceiver also may be compatible with WiFi communications. In the present example, we will assume that the digital transceiver 108 is a CDMA transceiver compatible with operation via a CDMA200 network or an EvDO network, to provide both voice communications as well as a variety of data communications.

The transceiver 108 provides two-way wireless communication of information, such as vocoded speech samples and/or digital message information. The transceiver 108 also sends and receives a variety of signaling messages in support of the various voice and data services provided via the station 100 and the communication network (described later with regard to FIG. 3). The transceiver 108 connects through RF send and receive amplifiers (not separately shown) to an antenna 110. In the example, the transceiver 108 is configured for RF communication in accord with a digital wireless protocol, such as one of the current CDMA protocols. The station 100 may include one or more additional transceivers, for example, for operation in an analog mode or in accord with an alternative digital standard. In discussing examples of remote wireless recovery, network communications via the transceiver 108 and antenna 110 will include upstream communications to establish a communication session with a recovery server and provide necessary information to the server as well as downstream communications from the server, for example, to receive programming and/or data to overwrite any programming or data in the wireless device that may have caused a detected error that is potentially unrecoverable.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a recovery operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone. Depending on the implementation of the recovery procedure, it may be desirable to provide information to the user and possibly receive one or more user inputs for the recovery, via the GUI elements of the wireless device 100.

A microprocessor 112 serves as a programmable controller for the wireless device 100, in that it controls all operations of the wireless device 100 in accord with programming that it executes, for all normal operations, and for operations involved in detecting a potentially unrecoverable programming error and conducting a wireless remote recovery procedure to address such an error. In the example, the wireless device 100 includes flash type program memory 114, for storage of various "software" or "firmware" program routines and mobile configuration settings, such as mobile identification number (MIN), etc. The wireless device 100 may also include a non-volatile random access memory (RAM) 116 for a working data processing memory. Of course, other storage devices or configurations may be added to or substitute for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user.

Programming 122 stored in the flash type program memory 114, sometimes referred to as "firmware," is loaded into and executed by the microprocessor 112. In the present example, the programs stored in the flash program memory 114 may be thought of as implementing one or more program stacks. FIG. 2 illustrates an exemplary organization of the program stacks and other programming that may be stored in the flash program memory 114 of the wireless device 100 of FIG. 1. As depicted in FIG. 2, the programming 122 includes a boot routine 124 and device drivers 126. Essentially, the boot routine is a program that allows the microprocessor 112 to load other programming and necessary data from memory at power-up, to initialize the operation of the microprocessor 112 and thus the wireless device 100. The device drivers 126 are the layer 1 software components that allow the microprocessor 112 to receive signals from and send control signals to the various hardware components of the wireless device 100 and thus control operations of that station.

For higher layer functions of the wireless device, the programming 122 also includes at least one program stack. To implement the wireless remote recovery discussed here, the programming 122 actually includes two program stacks.

A primary program stack 128 contains the primary executable program code, for functional layers 2-7, to allow the wireless device to communicate, to implement various service features or applications and to provide associated user interface functions. This programming, for example, includes a full operating system for the wireless device as well as communications software for layer 2 and layer 3 communications functions via the mobile network 11. Higher layers of the stack include various application programs. In normal operations of the wireless device 100, the microprocessor 112 executes instructions of the primary program stack 128.

Typically at the time of manufacture of the wireless device 100, an initial image of the firmware programming 122 is loaded into the flash memory 114, so that downstream customers are not burdened with an arduous set-up process of the wireless device. Notwithstanding, because flash memory 114 in the present embodiment is non-volatile memory, the manufacturer of the mobile phone 100 or service provider for the wireless device 100 is able to provide directly to a user firmware updates for the respective wireless device 100. Modern wireless devices also allow end users to access commercial services to download additional programming to the devices. As a result, post-manufacture, new features may be programmed in the wireless device 110, bugs may be fixed, and/or firmware or program stack 128 may be updated for efficient operation and increased functionality of the wireless device 100.

While it may be difficult to prevent firmware of the wireless device 100 from becoming corrupt and the wireless device 100 experiencing an unrecoverable error, the station may implement one or more mechanisms or techniques to fix such an occurrence. One approach upon detecting a problem involves one or more retries of communication through the network. Success of a retry may indicate correction of a temporary fault or may allow over the air communication with a facility offering a patch or repair function, such as a FOTA server. Another technique to resolve the problem is to return the corrupt data to a state before it became corrupt. To accomplish this, the primary program and any associated or included data stored in the flash memory 114 may be duplicated elsewhere in the device, such that the duplicated or redundant program and/or data may be accessed to overwrite the corrupted information the flash memory 114. The relevant portion of the primary program stack typically is the portion corresponding to layers 2 and 3. Inclusion of a duplicate program in a device, such as a wireless device, often is not feasible because of the small size of the device and the attendant low capacity for program storage in the device.

As outlined above, however, errors or faults may occur in the primary program in stack 128 that prevent network communication or might otherwise be unrecoverable. Hence, retries and/or overwriting with a locally stored duplicate copy may not be feasible or may not be sufficient to correct a particular error. The present techniques for wireless remote recovery from such errors therefore rely on inclusion of a backup program. In the example, the backup program takes the form of a secondary program stack 130 within the programming 122 stored in the device memory, that is to say in the flash memory 114 in the exemplary wireless device 100. The secondary program stack for wireless device remote recovery in the event of an otherwise unrecoverable fault would correspond to layers 2 and 3 of the programming of the wireless device, although the secondary stack typically is substantially smaller than the primary stack.

Each stack will include some data needed for the respective functions. The primary stack, for example, will have device identifiers such as the MDN and MIN that the carrier has assigned to the wireless device 100 and may have other credentials needed to access various services or communication features through the network. Both stacks may have access to the ESN of the device assigned and 'burned-in' by the manufacturer, if necessary. In the example, the secondary program will have stored information needed for the device recovery operation, including an address (e.g. a URL) for communicating with the recovery server, any other credentials if needed in a recovery communication, and information regarding the particular wireless device (e.g. make, model and/or firmware version or identifier) to enable the server to select and send the appropriate corrective recovery programming.

A new algorithm would be part of the primary stack to detect the error and cause and hand over to the secondary stack. The secondary stack would take over. Initial error detection could be automatic. However, in an example, the user activates error detection correction manually, e.g. via a soft key or button on the graphical user interface (GUI), a specific key sequence (such as hold <shift> <send> for 5 seconds), or a hard reset button that requires a pin/paper clip to reset. Once triggered, the algorithm makes at least some determinations automatically, e.g. to determine if a network is available, and if so, hands wireless device operation over to the backup program.

Upon such detection of a condition, indicating a potentially unrecoverable programming error or fault, the microprocessor 112 will stop its program execution of instructions in the primary program stack 128 and will instead execute instructions from the secondary program stack 130. In some implementations there may exist a backup processor supporting the secondary stack. The executable code and associated data forming the secondary program stack 130 provides sufficient functionality to enable communications through the network with a recovery server, receipt and storage of programming (executable code and associated data) from the server, and overwriting all or one or more portions of the primary program stack 128 with the programming obtained from the recovery server.

The secondary program stack 130, for example, may consist of a separate wireless protocol data stack (CDMA, or the like), a download client (HTTP, FTP, etc.) and a device update or device recovery agent. The secondary program stack 130 may include an operating system, although it may be a thinned-down operating system compared to that provided in the primary program stack 128. The secondary program stack 130 also may include or be associated with additional GUI software shown at 132, to support any user input or output needed to enable the recovery operation. In a recovery operation using the secondary stack, the user interface (UI) process flow might lead the user through any steps necessary to address the failure.

The wireless protocol components of the secondary program stack 130, for layer 2 and layer 3 communications functions via the mobile network 11, would most likely only provide a limited functionality needed for a packet communication through the network 11 to reach an appropriate recovery server. The download client manages downloading of programming from the server via the network communication.

As noted, the secondary stack implements a recovery 'agent.' The device update agent of the secondary program stack 130 is the executable programming to control temporary storage of received programming (e.g. in RAM) and then overwrite all or portions of the prior corrupted version of the primary stack 128 with the newly received programming. Upon successful recovery, the primary program stack 128 will have been overwritten with a sufficient new copy or version thereof that should be free of the error, therefore, the secondary program stack 130 will return operational control to the primary stack 128 e.g. via a device reboot, so that further execution by the microprocessor 112 can utilize the code and/or data of the recovered primary program stack 128.

The secondary stack will have a checksum for the programming that should reside in the wireless device, either on a block by block basis or for the entire replaceable portion firmware image, e.g. for the entire primary stack 128 or for the entire programming 122. After receiving new programming from the recovery server and overwriting the old programming with the new programming, the secondary stack verifies the checksum for the new programming against that of the old programming to confirm that the update has been successful. A test communication or diagnostic routine may then be run to determine if the recovery has successfully corrected the fault. An acknowledgement of successful recovery also may be provided to the recovery server.

As noted earlier, normal wireless device operation allows installation of new or upgraded programming, in this case, via the primary program stack 128. Such program downloading may modify or replace portions or all of the primary program stack. However, the policy in the wireless device controlling re-programming during normal operation will prohibit any re-programming of the secondary program stack 130. Also, the secondary program stack 130 does not contain the application program interface (API) for access thereto by downloaded applications. The policy and/or lack of such an API prevents corruption of the secondary program stack due to downloading or other program modification during normal operations. Additional security methods may be put in place around the secondary program stack 130.

Although the present example utilizes the term "stack" to describe the primary program and backup program, the term is intended in a general sense to refer to all types or configurations of primary and backup programming (executables and associated data) that may be utilized in a wireless device to achieve the described functionalities.

A separate flash memory may be incorporated into the wireless device 100 in order to store a redundant copy of the some or all of the data stored in the flash memory 114, e.g. to form the secondary program stack 130 in our example. However, the additional flash memory increases the volume occupied by the memory chip(s) within the wireless device 100, which typically occupies a tight compact form factor, with little or no available space for such extra hardware. The added memory also adds to the weight of the wireless device 100. Where space and/or weight is not a major concern, providing additional flash memory may be satisfactory. Where space and/or weight of the wireless device 100 should be minimized, another way to store the secondary program stack in the flash memory 114 is by partitioning the flash memory 114 into two or more sections or "partitions." The primary partition contains the firmware and associated data for the primary program stack 128 as described above, and the microprocessor 112 accesses the programming and data of stack 128 in the primary partition during normal operation. The secondary partition maintains the secondary stack programming and any associated data but is not used during normal operation. Rather the secondary partition may be accessed for recovery purposes to resolve an unrecoverable error that occurs in the wireless device 100.

Partitioning of the flash memory 114 provides several advantages. The memory partition may help to protect the secondary stack 130 from the unrecoverable fault that has corrupted the primary stack 128 of the programming of the wireless device 100. The backup or secondary program stack 130 would be burned in at the time of manufacture or of last valid update, after which the partition would prevent alteration of the data in the secondary stack 130 via normal operations via the primary stack 128. As a result, any errors or corruption that occurs in the program stack 122 in the primary partition would not affect the backup program stack 130 in the secondary partition. Some of the benefits of partitioning the flash memory 114 as described above also may be accomplished with physically separate storage spaces, e.g., using two flash memories (not shown), however, as noted two memories require additional space and add weight to the wireless device.

The wireless device will provide a mechanism to initiate a recovery operation that will utilize the secondary program stack, although it may try several other mechanisms to address the problem before activating the backup program in the secondary stack. This could entail operations via the user interface (UI) to initiate the recovery operation, in the case that the user believes that there is a fault, e.g. from a service menu. However, initiation of a recovery operation will typically entail at least one automatic function related to detection of an event or condition signifying a possibly unrecoverable fault. To detect such an event or condition, the wireless device 100 for example may implement a number of automatic communication retry operations, in a manner analogous to existing algorithms for data communication retries. The recovery algorithm may also reload some of the primary program stack in an attempt to restore. However, if these internal efforts to address the error are unsuccessful, then the recovery algorithm would automatically verify that it can connect to the network using the secondary program stack. In this way, the processing in the wireless device has exhausted all retries and/or reloads, but the wireless device is detecting a mobile network that it normally should be able to access, then the wireless device will assume that it has encountered an unrecoverable error or fault in its programming and initiate further recovery efforts using the secondary stack.

The wireless device 100 normally communicates via a network. The recovery communication also utilizes the network. To fully appreciate an implementation of the recovery technique, it may be helpful to consider an example as a system that supports such network communications.

FIG. 3 provides a high-level functional illustration of an overall communication system 10 offering wireless communication services. The example communication system 10 includes a mobile wireless communication network 11, operated by one or more mobile service providers or "carriers." Although the present concepts are applicable to other network architectures, such as WiFi hot spots and LANs, Bluetooth or ZigBee PANs or WIMAX or mesh-based WANs, for this discussion, it is assumed that the mobile wireless communication network 11 is a public cellular network.

The mobile network 11 provides a wide range of mobile communication services and ancillary services or features to users of subscribers' wireless devices (MSs) 100. The mobile network 11 provides communications between wireless devices as well as communications for the wireless devices with networks and stations outside the mobile communication network 11. Hence, for discussion purposes, the elements generally indicated by the reference numeral 10 include the mobile network 11 operated by or on behalf of the carrier and the wireless devices 100, although the wireless devices 100 typically are sold to the carrier's customers. The other elements of the illustrated system 10 connect to and interact with the mobile network 11 and the wireless devices 100, as discussed herein, although some or all of the other elements may be operated by the same carrier, a related or affiliated party (e.g. vendor supplying equipment to the carrier) or other entities.

For purposes of later discussion, several wireless devices 100 appear in the drawing, to represent examples of the wireless devices that may receive various services via the mobile network 11 and other elements encompassed by or in communication with the system 10. Today, wireless devices 100 typically take the form portable handsets, smart-phones or personal digital assistants, although they may be implemented in other form factors. The network 11 allows users of the wireless devices to initiate and receive telephone calls as well as to participate in an array of different types of data communication services.

The mobile network 11 typically is implemented by a number of interconnected networks. Hence, the 10 network 11 may include a number of radio access networks (RANs), as well as regional ground networks interconnecting a number of RANs and a wide area network (WAN) interconnecting the regional ground networks to core network elements, such as the MSCs. A regional portion of the network 11, such as that serving wireless devices 100, will typically include one or more RANs and a regional circuit and/or packet switched network and associated signaling network facilities.

Physical elements of a RAN operated by one of the mobile service providers or carriers, include a number of base stations represented in the example by the base stations (BSs) 13. Although not separately shown, such a base station 13 typically comprises a base transceiver system (BTS), which communicates via an antennae system at the site of base station and over the airlink with one or more of the wireless devices 100, when the wireless devices are within range. Each base station 13 typically includes a BTS coupled to several antennae mounted on a radio tower within a coverage area often referred to as a "cell." The BTS is the part of the radio network that sends and receives RF signals to/from the wireless devices that the base station currently serves.

The mobile network 11, particularly the base stations (BSs) 13 and their associated base transceiver systems may be configured to conform to any one or more of the current or future developed digital wireless communication standards. For example, the network 11 could be a 1×RTT/EvDO, TDMA or GSM network designed for cellular or PCS operation. One or more of the base stations may comprise a WiFi transceiver for hotspot operation. In the present example, we will assume that mobile network 11 is a CDMA type network for CDMA2000 operation, to provide both voice communications as well as a variety of data communications to users of compatible wireless devices (MSs) 100.

The radio access networks also include or interconnect to/though a traffic network represented generally by the area within the cloud at 11, which carries the user communications for the wireless devices 100 between the base stations and other elements with or through which the wireless devices communicate. Individual elements such as switches and/or routers forming the traffic network are omitted here form simplicity.

The traffic network portion of the mobile network 11 connects to a public switched telephone network (PSTN) 15. This allows the network 11 to provide voice grade call connections between wireless devices 100 and regular telephones 17 connected to the PSTN 23. The traffic portion of the mobile network 11 also connects to a public packet switched data communication network, such as the network commonly referred to as the "Internet" shown at 19, for communications with other data devices represented in the drawing by the server 23 and the personal computer (PC) type user terminal device 21. Packet switched communications via the network 11 and the Internet 19 may support a variety of user services through the network 11, such as wireless device communications of text and multimedia messages, e-mail, web surfing or browsing, programming and media downloading, etc. For example, the wireless devices 100 may be able to receive messages from and send messages to user terminal devices, such as personal computers, either directly (peer-to-peer) or via various servers (not separately shown).

The exemplary system 10 also includes one or more other packet communication networks 25 connected to the mobile network 11, for a variety of purposes that typically do not involve direct communication of customer traffic. For example, the carrier that owns/operates the mobile network 11 may utilize a secure private intranet for communications between elements of the traffic portion of the network 11 and various support systems, such as provisioning and billing systems. For purposes of discussing the wireless remote recovery concepts, the other packet data network 25 supports communications with software download servers, such as those shown at 27 and 29. If those servers are operated by the carrier, the network 25 may be the carrier's secure private intranet. If one or both is operated by a third party, such as a wireless device vendor or third party support service provider, then the network 25 may be a secure inter-company network or may utilize at least a portion of the public Internet.

In the example, the system 10 includes a Firmware Over-the-AIR ("FOTA") server 27. Communication between a wireless device 100 and the FOTA server 27, through mobile network 11 and network 25, allows the user of the station 100 to download program patches to fix bugs or errors. Patches or updates may be downloaded to the customer's wireless device 100 automatically or in response to customer initiation such as via the user interface. The carrier may also "push" updates to the wireless devices 100 assigned to its network 11. As noted above, such communications with the FOTA server require wireless device communication through the mobile network 11, and are effective as long as the primary program stack 128 in the wireless device 100 is sufficiently intact and operational as to enable the necessary network communications.

Such a FOTA capability may offer some diagnostic and patching technology that uses the existing firmware and just implements the patch, e.g. it goes through and replaces individual blocks of the programming until a problem is patched. However, if the FOTA patch does not work, the wireless device 100 may use the secondary stack 130 to re-install the primary programming in stack 128 via recovery communications.

Despite FOTA capability, the wireless device 100 may experience an unrecoverable error, e.g. one that prevents the wireless device from self-correcting the error and/or connecting to the communication network to use FOTA. These unrecoverable errors are typically a result corrupt data stored in the flash memory 114 that renders the microprocessor 112 inoperable to some extent. For example, the first sector for a given program in the primary stack, which is the start point when accessed upon execution of the boot routine, may be corrupt. If the affected program is for connecting the wireless device 100 to a communication network, the wireless device 100 may be unable to connect to the mobile network 11. In such a case, previously the user of the wireless device 100 had to return the wireless device 100 for servicing because the firmware of the wireless device 100 became corrupt.

For those situations in which a wireless device 100 encounters a potentially unrecoverable error of a type that precludes primary stack communications through the mobile network 11 (e.g. with the FOTA server 27), the system 10 also includes a recovery server 29 configured to interact with the secondary program stack 130 to address the potentially unrecoverable error. The recovery server 29 is connected to the network 25 and communicates with the wireless devices 100 via the networks 11 and 25. The recovery server 29 stores programming images for various types (makes/models) of wireless devices 100 of the carrier's customers.

In an initial implementation, the programming image for a given type of wireless device would include the most current update of the programming/firmware for that type of wireless device including the full primary program stack and the secondary program stack, which should reside in the particular wireless device. With such an implementation, a download to a wireless device would essentially overwrite the corrupted (subject to the potentially unrecoverable error) primary program stack 128 with a new copy of the current update for that stack from the server 29. The download may similarly overwrite the secondary program stack 130.

It is also envisaged that the recovery server 29 might store the primary stack for one or more of the wireless device types in the form of individual blocks or modules, corresponding to blocks or modules of the primary stack in the wireless device. With this later implementation, blocks or modules could be downloaded and overwritten sequentially until the error is corrected, which in some cases may not require an overwrite of the complete primary and secondary stacks.

When the wireless device 100 encounters a potentially unrecoverable programming error, processing switches over to execution of the secondary program stack 130. Execution of the stack 130 by the microprocessor 112 causes the wireless device 100 to initiate a packet data communication session through the mobile network 11 and the additional data network 25 with the recovery server 29. Once the communication session is established, the secondary stack sends up information regarding the wireless device 100 to the recovery server 29, e.g. in a message requesting recovery. The information, for example, includes make and model identification. The information may also identify the firmware version currently loaded in the wireless device 100. Based on the received information regarding the wireless device that needs recovery, the recovery server 29 determines whether or not it has the programming image necessary to restore the particular type of wireless device, among the firmware for the various wireless devices it is currently able to service. If the server 29 has the restore programming for the particular device, then the recovery server 29 selects and sends the appropriate replacement programming through the networks 25 and 11 to the particular wireless device 100. The secondary program stack 130 causes the wireless device to receive and temporarily store the downloaded replacement program image, e.g. in RAM 116, then the secondary stack 130 uses that new firmware image to overwrite the primary program stack 128 in the flash memory 114, thus replacing corrupted programming with correct programming that presumably will correct the error impacting the wireless device.

During recovery, a full overwrite of the primary program stack and possibly of the secondary program stack may be performed. In the event of a full overwrite, the current stored copy of secondary stack 130 provides the make and model number of the wireless device 100. The recovery server 29 checks to see if it has the firmware corresponding to the make and model number of the wireless device 100. If it does, then the firmware image is downloaded to the wireless device 100, and the wireless device 100 performs a full overwrite.

Alternatively, a repair operation may be performed where only the corrupted portion of the primary program stack 128 is corrected. In such case, the secondary program stack 130 provides information in addition to the make and model number of the phone, for example, the firmware version number.

The type of restoration and thus the type of information that the secondary stack 130 sends to the recovery server 29 also may depend on class of wireless device 100. If the wireless device 100 uses multiple processors, for example, the secondary stack may also send up information about the processors and/or other hardware. Diagnostic communications may also be used to determine the nature of the fault in a repair operation.

From the discussion above, it will be apparent that the secondary program stack 130 resident in the wireless device 100 needs to have certain information available, to facilitate communication with the recovery server 29 and to provide certain information to the server. For example, the secondary program stack 130 is provisioned with the information necessary to initiate a recovery operation, such as the make and model number, possibly the firmware version and an address for the recovery server. The address of the recovery server 39 could be an IP address but typically would be a URL of the recovery server functionality. The provisioned information may also include appropriate security credentials, such as a user name and password. The necessary information may be stored (burned) in the wireless device 100 at manufacture, e.g. in ROM (not shown) or in a write-protected area of the flash memory 114, and corresponding information provisioned in the recovery server 29. The user name and password may be similarly burned in at manufacture or provisioned in a secure portion of the program stack 130 by the carrier at initial service activation.

Over the air update capability can update the primary capability offered by stack 128. Over the air program downloading could also update the secondary program stack via FOTA and or recovery server 29. However, this would run the risk of corrupting the secondary program stack. In order to avoid such corruption, one possibility would be to prohibit update or other modification of the secondary program stack over the air. It may be prohibited on the device or on the network end.

The structure and operation of the wireless device 100, the programming 122 and the system 10, as outlined above, were described to by way of example, only. Using a wireless device 100 of FIG. 1 and the system 10 of FIG. 3, as an example, it may be helpful now to consider the signal or call flow of FIG. 4 in somewhat more detail, as illustrative of the steps involved in an exemplary process of detecting a potentially unrecoverable error and performing a wireless remote recovery from the error, using the secondary program stack and the recovery server.

The software of the wireless device 100 causes the microprocessor 112 to monitor communications functions of the device (S1). As long as operations are normal, processing continues (the Yes branch from S2). However, upon detection of a problem at S2, e.g. a communication failure indicating a loss of network connectivity/access, the device 100 will enter the fault procedure (the No branch from S2 to S3). The problem could be automatically detected; or as outlined earlier, the user may manually trigger a repair operation (alternate detection of a problem). Initially upon activation of this fault procedure, the device 100 may make a number of retries (at S4)

using its primary programming, as outlined earlier. After each retry, the microprocessor of the device determines (at S4) if the retry was successful, and if so, processing resumes normal operations (at S5).

However, after each failure of a retry (No branch from S4), the microprocessor of the device determines (at S6) if it has exhausted some prescribed maximum number of retries. As long as the retries are unsuccessful, the processing will loop through S3, S4 and S6 until the device reaches the prescribed maximum number of retries (the station exhausts the retries). When retries are unsuccessful and the prescribed number of retries have been exhausted (Yes branch from S6), processing branches to step S7. Some implementations may not include retry capabilities, in which case, steps such as S3 to S6 would be omitted.

At S7, the microprocessor 112 of the wireless device 100 determines or verifies whether the network 11 is available. If the network 11 is unavailable, the fault may be on the network side. Hence, the programming of the device 100 may not be at fault, or at least the error may not be potentially unrecoverable, once the network becomes available again in the future. Although there may be a number of ways to address this situation, for simplicity, the flow chart shows a delay at S8 in which the wireless device 100 waits for a predetermined interval and then attempts to return to normal operation at S5.

Assume now that at the point in which the processing reaches step S7, the microprocessor 112 of the wireless device 100 determines or verifies whether the network 11 is available. In the event that the primary communications have failed, the retries have failed and the wireless device detects that the network 11 is available (flow through Yes branch from S7), then the processing branches so as to initiate a recovery procedure using the back-up or secondary program stack. Hence, in the flow of FIG. 4, the microprocessor 112 activates the secondary program stack 130 at step S9, effectively switching its execution over from the primary program to the backup program.

In our example, the primary program stack 128 implements the procedures for monitoring communications, detecting failure or loss of communication capability, initiating retries, and verifying network availability, e.g. steps S1-S8. To initiate the recovery procedure using the secondary stack, the primary programming in stack 128 would handover control of device operations to the back-up or secondary programming of stack 130 upon detecting the potentially unrecoverable fault. A circumstance may arise in which the primary software stack is so corrupted that it may not be able to detect the fault and handover operations to the secondary stack in the procedure outlined above. For that purpose, the wireless device 100 may also run a 'watch-dog' program to detect so substantial a failure of the primary software stack and provide a secondary mechanism to activate the backup program.

Figure 4:
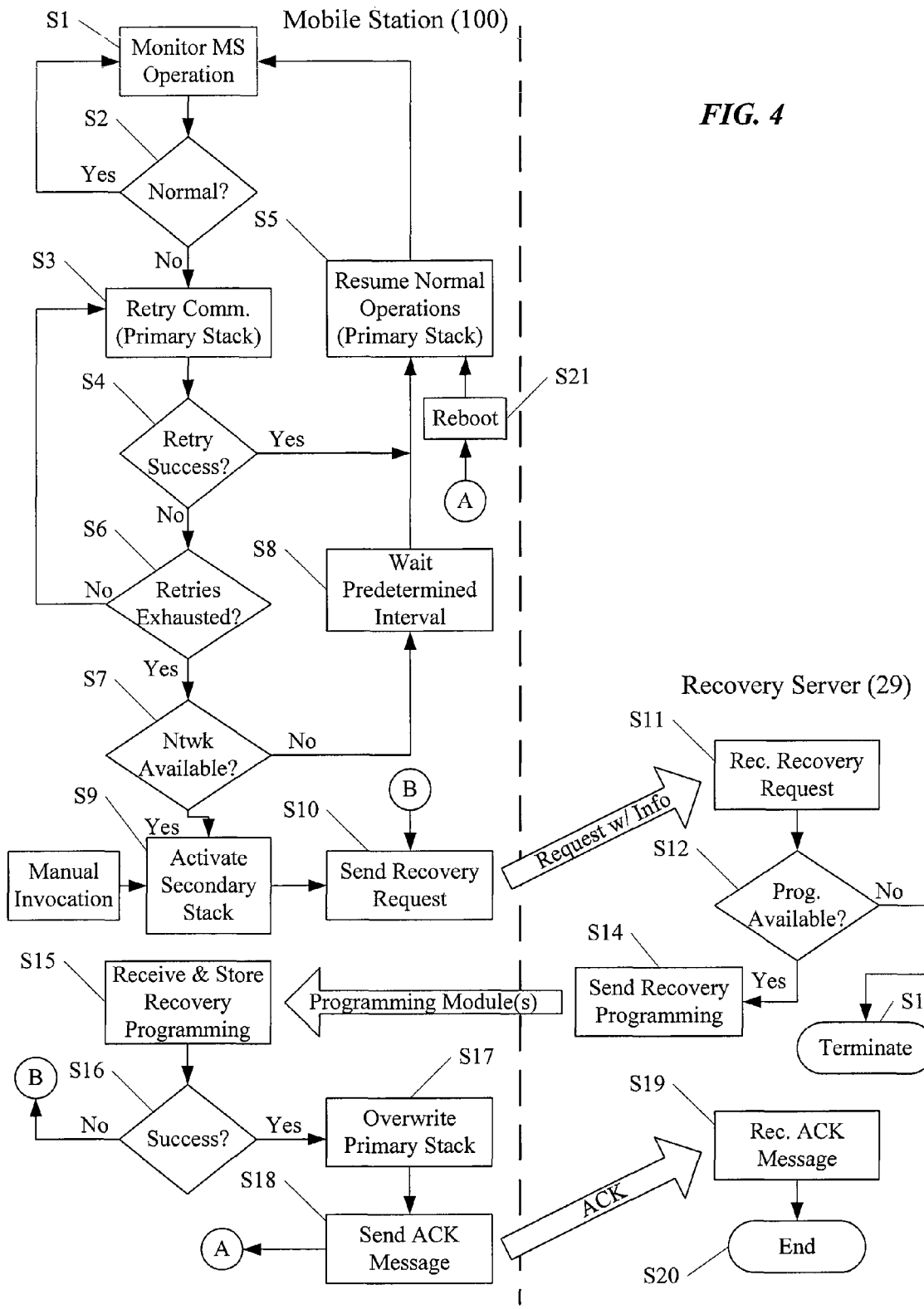
FIG. 4 is a flow chart illustrating an example of a process of wireless remote recovery in the event of a potentially unrecoverable programming error.

In the example of FIG. 4, invocation of the secondary program stack at S9 assumes that the wireless device 100 has suffered a potentially unrecoverable programming error (as automatically detected by the primary program stack or by a watch-dog program). When activated, execution of the secondary program stack causes the wireless device 100 to initiate a communication attempt through the mobile network 11 to the recovery server 29, using data in or associated with the secondary stack. Hence, in the example of FIG. 4, at step S10, execution of the secondary program stack 130 by the microprocessor 112 causes the wireless device 100 to send a recovery request message through the networks of system 10 to the recovery server 29.

The secondary program stack 130 is provisioned with the any information necessary to initiate a recovery operation, including an address such as a URL for use in communicating with the recovery server 29. Using the URL or other type of address for the sever, the secondary stack 128 causes the wireless device 100 to initiate a data communication session through the mobile network 11 and the other data network 25 with the server 29. Via that session, the secondary stack 128 causes the wireless device 100 to send an initial message, which may be considered as a request for recovery of the device firmware. The request message will include any information regarding the wireless device, that the server needs to perform the recovery operation, such as the make and model number of the wireless device 100, and possibly an identification of the firmware version of the programming currently resident in that station. The message may also include device identification information, for example, the ESN and/or the MDN or MIN for verification that the requesting device is a valid device of a subscriber to the carrier's services.

In the process flow of FIG. 4, the recovery server 29 receives the recovery request message in step S11 and extracts the relevant information. Any device validation and/or user validation steps are omitted, for simplicity. In the example, the recovery server 39 uses the received information, e.g. make and model information and possibly the firmware identification, to determine whether or not it has the programming image necessary to restore the particular type of wireless device (step S12). If the recovery server 29 does not have the requisite programming for the recovery of the particular device 100 (No branch from step S12), then the server 39 will terminate the recovery operation as shown generally at S13. Although not separately shown, signaling may be provided back to the wireless device and via the GUI to the user, to advise the user that the error requires service by the carrier's technician, in which case the user likely must take the wireless device 100 to a store or another location that has the capability to service the wireless device.

However, if the server 29 has the restore programming for the particular device (Yes branch from step S12), then the recovery server 29 uses the wireless device information to select and retrieve the appropriate programming from storage, and the server 29 sends the programming through the networks 25 and 11 to the particular wireless device 100 (at step S14). As outlined above, the communication of the programming may involve a block by block transfer until the error is corrected. However, for ease of discussion with regard to the example of FIG. 4, it is assumed that the recovery operation sends one copy of the entire programming image that is to be replaced in the recovery operation, that is to say a copy of the latest operable version of the primary program stack 128 and possibly the secondary program stack 130.

The resident copy of the secondary program stack 130 already running in the wireless device 100 causes that station to receive and temporarily store the downloaded program image (at step S15). At step S16, the microprocessor 112 of the wireless device 100 will determine if it has successfully received the downloaded programming. For example, the secondary program stack 130 may have a checksum for the programming that should reside in the wireless device 100, either on a block by block basis or for the entire firmware image. After receiving new programming from the recovery server 29, execution of the secondary stack 128 enables the microprocessor 112 to verify the checksum for the new programming against that of the old programming to confirm that the update has been successfully received. If the determination is that the download was not successful (No branch at step S16), the wireless device can take steps to correct this problem, for example, by returning to step S10 to again request recovery. Of course, the new request may include information regarding the failure, to inform the server 29 and assist in overcoming the problem in the next download operation.

Returning to our discussion of step S16, assume now that the microprocessor 112 determines that the downloading of the new programming was successful (Yes branch at step S16). Hence, at step S17 the secondary stack 130 causes the microprocessor 112 to use the new firmware image to overwrite the primary program stack 128 in the flash memory 114. Although not separately shown, a test communication or diagnostic routine may then be run to determine if the recovery has successfully corrected the fault. An acknowledgement of successful recovery also may be provided to the recovery server 29 at step S18. Upon receipt of the acknowledgement at S19, the recovery server 29 ends its processing at step S20. On the device side, operations return to normal, by executing a reboot S21 and flow back to S5, in our example. Of note, the further normal operations will now utilize the primary stack that has been corrected or restored by the download at S14-S15 and the overwrite operation at S17.

Although the process example above focused on overwriting the primary stack, the process may serve to overwrite some or all of the secondary stack 130, the layer 1 firmware (drivers, etc.) 126 and/or the boot routine 124. The overwriting of the firmware image includes overwriting of the executable code and may include overwriting of any necessary or associated data, such as device or user identification information, security tokens or other credentials needed for normal access to services that the carrier offers through the mobile network 11.

In the example above, the download provided a portion (some or all) of the primary program stack. However, the program download from the recovery server could include a new copy of the boot block, the drivers and the primary program stack, i.e. essentially an entire copy of the normal firmware of the device. Download of a copy of the backup program could be permitted, but that may be prohibited to avoid potential corruption of the backup program. The boot block and other firmware could be downloaded in phases, with a test after each download stage. Depending on the programming configuration of the type of wireless device, a rewrite of the entire firmware may result in loss of user stored data, such as contact list, ringtones and multimedia stored data. For such a wireless device configuration, it may be preferable to replace the programming block by block until the error is corrected, in the hope that the error can be corrected at a level that does not delete user data or at least at a level that can save some of the user data.

For a block by block download procedure, the server 29 may give the recovery session an identifier, when the wireless device 100 initiates the recovery procedure with the recovery server 29. In the event of an interruption of communication between the wireless device and the recovery server, e.g. to test the device after an overwrite of some but not all of the primary program, the device would use the session identifier when it again contacts the recovery server. In turn, the recovery server would recommence the recovery operation from the same point, e.g. so as not to reload the same software, since the first overwrite did not fix the programming error. Correlators or other data in the wireless device-to-server communications could be used to indicate in a later communication that actions have been taken/completed but that the fault is the same and has not yet been recovered. For example, a second communication might indicate that the boot block was successfully replaced but the error persists, in which case the server should proceed to download the next higher block of the program stack that may be subject to replacement.

The present teachings are amenable to a variety of modifications. For example, the recovery procedure using the backup program may be triggered upon fully automatic detection of a potentially unrecoverable programming fault. However, the recovery operation may be triggered in other ways. The wireless device may also offer a user activated option to initiate such a recovery procedure, e.g. as an option from one of the menus provided on the wireless device. Another approach would be to allow the network to instruct the wireless device to initiate the recovery procedure, for example, if the network detects some aspect of wireless device operations that are otherwise abnormal. Also, the recovery technology may be applied to wireless devices capable of operating through any wireless communication network, for example, any generation of GSM, TDMA, CDMA or 802.x network and also includes other wireless protocols such as Bluetooth, IrDA or wireless communication not based on existing industry standards for wireless communication.

As shown by the above discussion, functions relating to the wireless remote recovery technique, for addressing potentially unrecoverable errors in programming of a wireless device, may be implemented by means of a backup program or stack and associated data as well as in programming of a computer or the like connected for data communication via the components of a packet data network, operating as the recovery server as shown in FIG. 3. FIG. 1 provides an example of the hardware of the wireless device, and FIG. 2 provides a high level diagram of the architecture of the programming, including the backup program or stack. Although special purpose devices may be used to implement the recovery server, such a device also may be implemented using one or more hardware platforms intended to represent a general class of data processing device commonly used to run "server" programming so as to implement the functions discussed above, albeit with an appropriate network connection for data communication.

Figures 5, 6:
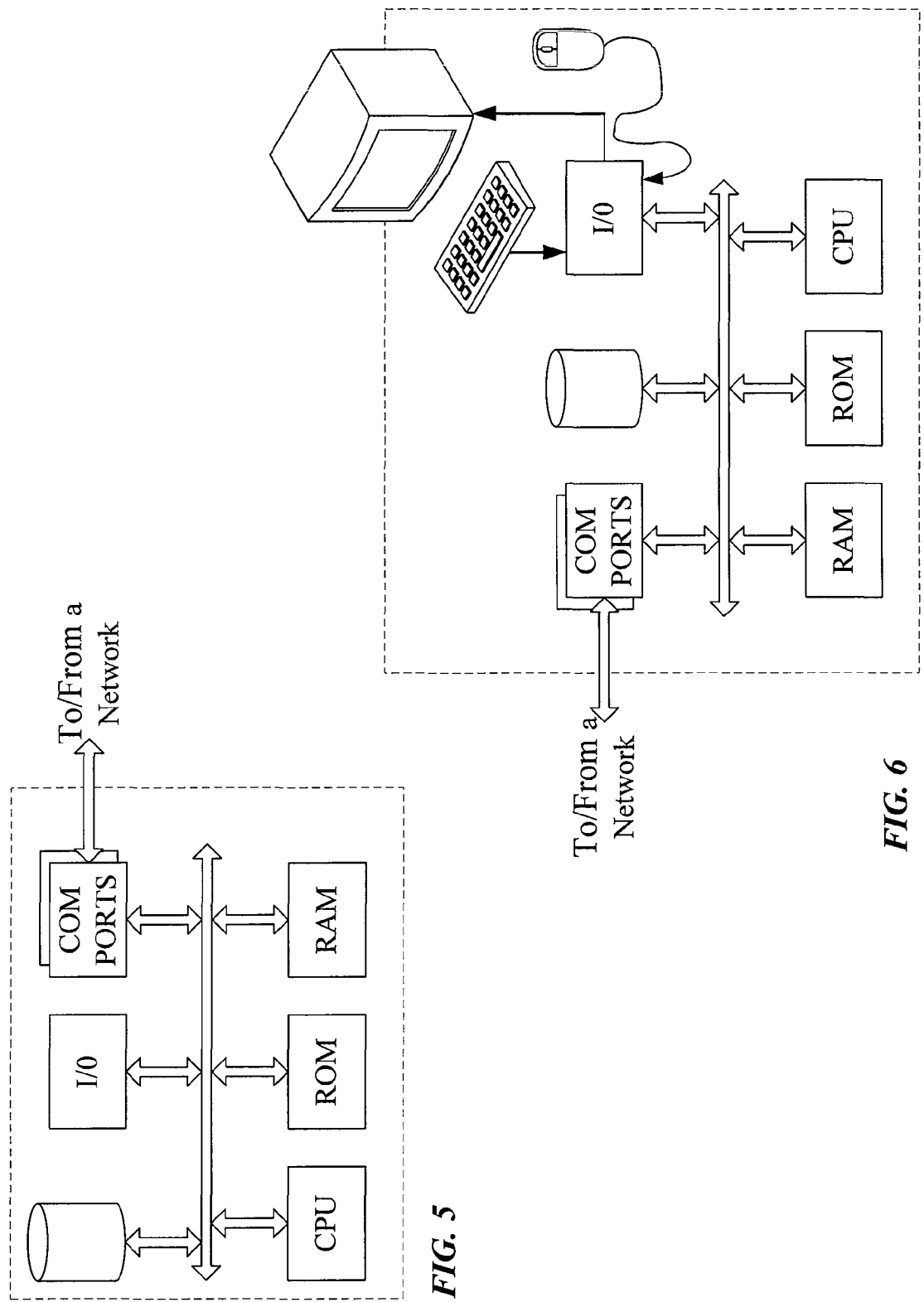
FIG. 5 is a simplified functional block diagram of a computer that may be configured as a host or server.
FIG. 6 is a simplified functional block diagram of a personal computer or other work station or terminal device, although that device also may be configured as a server.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. In this case, the storage of the computer platform operating as recovery server 29 contains corrective programming for a number of different types of wireless devices 100. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of wireless remote recovery for a wireless device, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the memory of the wireless device(s), computers, processors or the like, or associated modules thereof, such as various semiconductor memories, tape drives, disk drives and the like, which may provide storage at any time for the relevant programming. All or portions of the programming may at times be communicated through the Internet or various other telecommunication networks. Such communications, for example, may enable loading of the programming from one computer or processor into another, for example, from the recovery server into the wireless device or from a management server or host computer of the network operator into the computer platform of the recovery server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, message protocols and system components. Although generally known, use of several of these acronyms is not strictly standardized in the art. For the convenience of the reader, the following list correlates acronyms to terms, as used in the drawings and in the detailed description above.

BS—Base Station
BTS—Base Transceiver System
CDMA—Code Division Multiple Access
CPU—Central Processing Unit
eNB—evolved Node B
ESN—Electronic Serial Number
EvDO—Evolution—Data Only
FOTA—Firmware Over-the-Air
FTP—File Transfer Protocol
GSM—Global System for Mobile
GUI—Graphical User Interface
HTTP—HyperText Transfer Protocol
I/O—Input/Output
IP—Internet Protocol
LAN—Local Area Network
MDN—Mobile Directory Number
MIN—Mobile Identification Number
MSC—Mobile Switching Center
MS—Mobile Station
OEM—Original Equipment Manufacturer
OTA—Over-The-Air
PAN—Personal Area Network
PC—Personal Computer
PDA—Personal Digital Assistant
PSTN—Public Switched Telephone Network
RAM—Random Access Memory
RAN—Radio Access Network
RF—Radio Frequency
ROM—Read Only Memory
TDMA—Time Division Multiple Access
UI—User Interface
URL—Universal Resource Locator
WAN—Wide Area Network
WiFi—Wireless Fidelity
WIMAX—Worldwide Interoperability for Microwave Access

What is claimed is:

1. A method of wireless remote recovery for a wireless device, the method comprising steps of:
detecting, by either a programmable controller controlling operations of the wireless device or manual intervention, a potentially unrecoverable programming error during execution of a primary executable program causing a failure of normal communications through a wireless network serving the wireless device;
verifying availability of the network for communications by the wireless device;
responsive to the detected programming error and verified availability of the network, changing execution of programming by the programmable controller, from execution of the primary program over to execution of a backup executable program, wherein the backup program provides sufficient functionality to enable communications by the wireless device through the wireless network;
under control of the backup program, initiating communication with a recovery server, over the air through the wireless network;
receiving programming from the recovery server via the communication through the wireless network, the received programming including a replacement version for at least a portion of the primary program;
correcting the primary program in storage in the wireless device by replacing the portion of the primary program with the received replacement version, to correct the programming error; and
resuming normal operation of the wireless device by resuming execution by the programmable controller using the corrected primary program from storage in the wireless device.

2. The method of claim 1, wherein the received programming includes a replacement version for the entire primary program.

3. The method of claim 2, wherein the received programming further includes a replacement version for at least a portion of the backup program.

4. The method of claim 1, wherein the wireless device automatically performs the step of detecting the potentially unrecoverable programming error causing the failure of normal communications through the wireless network serving the wireless device.

5. The method of claim 1, wherein the verifying step comprises:

automatically verifying availability of the network for communications by the wireless device despite the detected failure of normal communications.

6. The method of claim 1, further comprising:
upon establishing the communication with the recovery server, through the wireless network, sending information regarding the wireless device to the recovery server,
wherein the programming is selected and sent from the recovery server to the wireless device via the communication through the network, based on the information regarding the wireless device.

7. The method of claim 6, wherein the information regarding the wireless device identifies make and model of the wireless device.

8. The method of claim 7, wherein the information regarding the wireless device further identifies the primary program currently in storage in the wireless device.

9. The method of claim 1, further comprising steps of:
under control of the backup program, determining whether or not the programming has been received successfully;
upon determining the programming has not been received successfully, sending a request to the recovery server, the request including information regarding the failure; and
again receiving programming including a replacement version for at least a portion of the primary program from the recovery server via the communication through the wireless network,
wherein the step of correcting the primary program in storage in the wireless device is performed upon confirmation of successfully receiving a replacement version for at least a portion of the primary program.

10. The method of claim 1, further comprising steps of:
receiving from the recovery server a recovery session identifier for the operation of receiving the programming including a replacement version for at least a portion of the primary program; and
upon an interruption of communication between the wireless device and the recovery server before completion of the receiving step, sending the session identifier to the recovery server for use in recommencing the operation from the point of interruption.

11. The method of claim 1, further comprising steps of:
determining a first instance of receiving and correcting did not fix the programming error;
sending information regarding the first instance of receiving and correcting to the recovery server indicating that the programming error has not been corrected; and
performing further steps of receiving and correcting to successfully correct the programming error.

12. An article of manufacture, comprising:
a machine readable storage medium; and
programming instructions embodied in said medium for execution by a programmable controller of a wireless device, wherein execution of the programming instructions by the programmable controller causes the wireless device to perform functions comprising:
 (a) detecting a potentially unrecoverable programming error during execution of a primary executable program, by either the programmable controller controlling operations of the wireless device or by manual intervention, the detected programming error causing a failure of normal communications through a wireless network serving the wireless device;
 (b) verifying availability of the network for communications by the wireless device;
 (c) responsive to the detected programming error, changing execution of programming by the programmable controller, from execution of the primary program over to execution of a backup executable program, wherein the backup program provides sufficient functionality to enable communications by the wireless device through the wireless network;
 (d) under control of the backup program, initiating communication with a recovery server, over the air through the wireless network;
 (e) receiving programming from the recovery server via the communication through the wireless network, the received programming including a replacement version for at least a portion of the primary program;
 (f) correcting the primary program in storage in the wireless device by replacing the portion of the primary program with the received replacement version, to correct the programming error; and
 (g) resuming normal operation of the wireless device by resuming execution by the programmable controller using the corrected primary program from storage in the wireless device.

13. The article of claim 12, wherein execution of the programming instructions by the programmable controller causes the wireless device to automatically perform the function of detecting the potentially unrecoverable programming error causing the failure of normal communications through the wireless network serving the wireless device.

14. The article of claim 12, wherein the function of verifying availability of the network for communications comprises:
automatically verifying availability of the mobile network for communications by the wireless device despite the detected failure of normal communications.

15. The article of claim 12, further comprising:
data embodied in said medium for use by the programmable controller during execution of the backup program, wherein the data includes:
an address for the recovery server, for use in communications with the recovery server through the wireless network; and
information regarding the wireless device for communication to the recovery server to enable the recovery server to select the programming to send to the wireless device.

16. The article of claim 15, wherein the information regarding the wireless device identifies make and model of the wireless device.

17. The article of claim 16, wherein the information regarding the wireless device further identifies the primary program currently in storage in the wireless device.

18. The article of claim 15, wherein the programming instructions comprise:
programming for implementing the function of detecting the potentially unrecoverable programming error; and
the backup program.

19. A wireless device for communication through a wireless network, comprising:
a transceiver for over the air communication to and from the network;
a programmable controller coupled to the transceiver, for controlling operations of the wireless device including communications of the wireless device through the wireless network;
storage coupled to the programmable controller; and
programming in the storage for execution by the programmable controller, wherein the programming comprises:

a primary executable program, wherein the programmable controller executes the primary program to control normal operations of the wireless device including normal communications through the wireless network and executes the primary program to detect a potentially unrecoverable programming error sufficient to cause a failure of normal communications through the wireless network during execution of the primary program and upon detecting the error to verify availability of the wireless network for communications by the wireless device; and a backup executable program to provide sufficient functionality to enable communications by the wireless device through the wireless network, wherein the programmable controller switches over execution from the primary program to the backup program responsive to the detection of the potentially unrecoverable programming error in the primary program and the verified availability of the wireless network, and execution of the backup program by the programmable controller causes wireless device to:

(a) communicate over the air through the mobile network with a recovery server, to obtain programming including a replacement version for at least a portion of the primary program;

(b) correct the primary program in the storage by replacing the portion of the primary program with the received replacement version, to correct the programming error; and (c) resume normal operation of the wireless device by resuming execution by the programmable controller using the corrected primary program from the storage.

20. The wireless device of claim 19, wherein:

the primary program comprises a primary program stack, including programming for layer two and layer three communication functions through the wireless network; and the backup program comprises a secondary program stack, including backup programming for layer two and layer three communication functions through the mobile network.

\* \* \* \* \*